United States Patent [19]

McGowan

[11] Patent Number: 4,979,436
[45] Date of Patent: Dec. 25, 1990

[54] SMOKING AND BAKING APPARATUS

[76] Inventor: Michael J. McGowan, 8245 Dixie Shreveport Rd., Shreveport, La. 71107

[21] Appl. No.: 299,624

[22] Filed: Jan. 23, 1989

[51] Int. Cl.⁵ ............................................. A47J 37/07
[52] U.S. Cl. ........................................ 99/340; 99/448; 99/482; 126/25 R; 126/369
[58] Field of Search ................. 99/450, 448, 447, 417, 99/352, 482, 474, 473, 468, 467, 340; 126/25 R, 41 R, 369, 369.2, 348, 21 R, 59.5

[56] References Cited

U.S. PATENT DOCUMENTS

| | | | |
|---|---|---|---|
| 678,212 | 7/1901 | Alphin | 99/482 X |
| 1,130,519 | 3/1915 | Keller | 126/369 X |
| 2,851,941 | 9/1958 | Cogar | 126/59.5 |
| 3,030,486 | 4/1962 | Lashley | 99/481 |
| 3,087,414 | 4/1963 | Gannon | 126/25 R X |
| 3,109,359 | 11/1963 | Falla | 99/417 X |
| 3,299,800 | 1/1967 | Angelo | 99/417 |
| 3,379,190 | 4/1968 | Leach | 126/25 R |
| 3,477,360 | 11/1969 | Raney | 126/25 R X |
| 3,481,267 | 12/1969 | Saiki | 126/25 R X |
| 3,868,943 | 3/1975 | Hottenroth et al. | 126/25 R |
| 4,094,295 | 6/1978 | Boswell | 126/25 R |
| 4,300,444 | 11/1981 | Muse | 99/417 X |
| 4,334,462 | 6/1982 | Hefling | 126/25 R X |
| 4,495,860 | 1/1985 | Hitch et al. | 99/417 X |
| 4,554,864 | 11/1985 | Smith et al. | 126/25 R X |
| 4,649,811 | 3/1987 | Manganese | 126/369 X |
| 4,721,037 | 1/1988 | Blosnich | 126/25 R X |
| 4,738,245 | 4/1988 | Su | 126/369 |

FOREIGN PATENT DOCUMENTS 369339 2/1923 Fed. Rep. of Germany ........ 99/481

Primary Examiner—Harvey C. Hornsby
Assistant Examiner—Scott J. Haugland
Attorney, Agent, or Firm—John M. Harrison

[57] ABSTRACT

A smoking and baking apparatus which is characterized by a cabinet having an outer shell and an inner shell that define a smoke channel therebetween. A firebox is located in the bottom of the cabinet and a pair of spaced flanges are positioned over the firebox for receiving a removable water pan. One or more doors close the cooking chamber of the cabinet, which cooking chamber is located above the firebox and is defined by the inner shell. A separate door closes the firebox and the water pan separates the firebox from the cooking chamber. A vertical duct or chimney is provided in the cabinet channel, which chimney opens to the smoking chamber at the lower end of the inner shell above the water pan and to the atmosphere at the upper end of the outer shell. When the water pan is resting on the spaced flanges over the firebox beneath the cooking chamber, smoke generated in the firebox is diverted by the water pan upwardly into the channel formed by the outer shell and the inner shell. The smoke then travels from the channel downwardly into the cooking chamber, across food located on removable shelves or trays in the cooking chamber and upwardly through the chimney to the atmosphere. Smoking and baking are effected in the cooking chamber of the apparatus when the water pan is in place, while barbequing and grilling may be accomplished with the water pan removed, wherein smoke and heat are introduced directly into the cooking chamber.

3 Claims, 1 Drawing Sheet

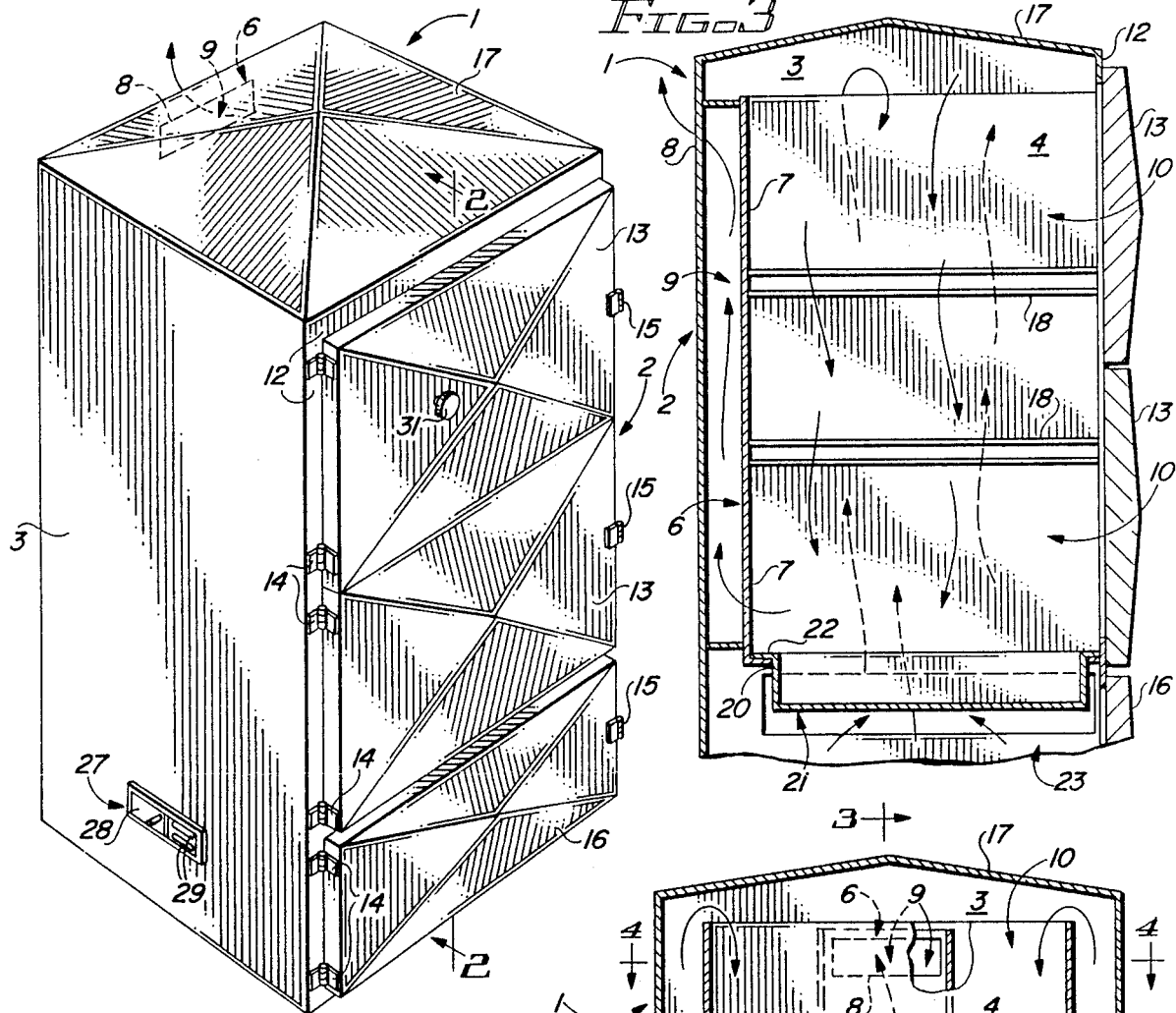
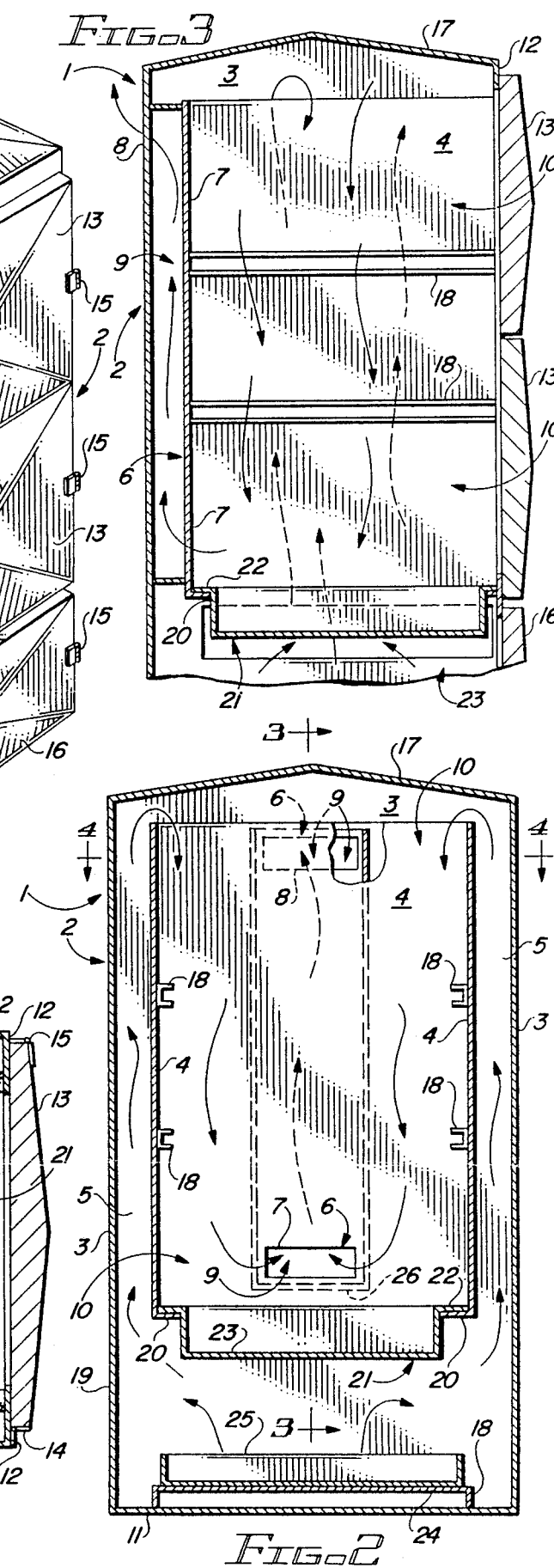
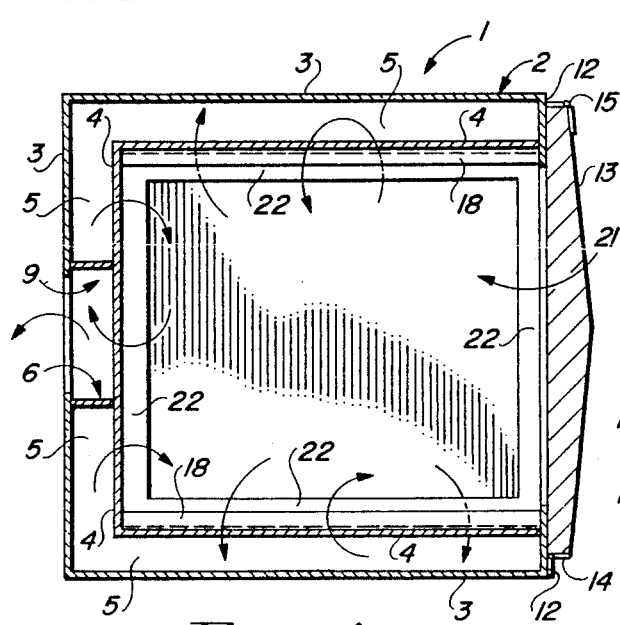

SMOKING AND BAKING APPARATUS

BACKGROUND OF THE INVENTION

1. Field of the Invention

This invention relates to cooking and smoking devices and more particularly, to a smoking and baking apparatus which is characterized by an upward-standing cabinet having a firebox and removable fuel tray in the bottom thereof and an outer and inner shell, with an channel defined by the outer shell and inner shell. A removable water pan is located in the cabinet above the firebox, for directing smoke from the firebox upwardly through the channel around a centrally located cooking chamber defined by the inner shell. A vertical chimney is provided in the cabinet channel, which chimney communicates with the cooking chamber at a chimney inlet located in the bottom segment of the inner shell, and the chimney vents to the atmosphere through a chimney outlet provided in the upper portion of the outer shell. When the water pan is placed in the cabinet, smoke generated in the firebox is deflected by the water pan through the channel and downwardly into the cooking chamber across spaced trays containing meat or other food to be smoked and baked, and subsequently upwardly, through the chimney to the atmosphere. The removable water pan provided in the cabinet thus serves to facilitate smoking and baking food in the cooking chamber when located in the cabinet, and barbequing and grilling the food, when removed. In a preferred embodiment the fuel tray is removable from the firebox in the cabinet for removing ashes and recharging with wood, charcoal or other fuel.

One of the problems which exist in conventional smoking and cooking devices is that of maintaining the smoke in contact with meat or other food to be cooked for a sufficient period of time to permeate the meat and food and create a desirable smoked flavor. Another problem is excessive drying of the food and particularly meat, by applying too much heat directly to the food. Still another problem found in many smoking and cooking devices, is poor access to the smoked food and the corresponding difficulty of placing food in, and removing food from the device. Yet another problem which is sometimes realized while using these devices to cook food in cold weather, is that of poor insulation in the smoker/cooker, a condition which results in extended cooking time and excessive drying of the food.

2. Description of the Prior Art

Various devices are known in the art for distributing smoke and other vapor from a central location throughout a cabinet or housing, in order to contact the smoke or vapor with food products placed in the housing. U.S. Pat. No. 678,212, dated July 9, 1901, to G. E. Alphin, details a "Fumigating Apparatus", which includes an upward-standing enclosure provided with fluid reservoirs for containing a quantity of fumigating fluid. The enclosure is designed to facilitate the passage of fumigating vapors from the reservoirs throughout the enclosure to fumigate various fruits and vegetables placed on trays located in the enclosure. A "Metallic Smokehouse" is detailed in U.S. Pat. No. 1,327,937, dated Jan. 13, 1920, and U.S. Pat. No. Reissue 14,965, dated Oct. 26, 1920, to B. Bilderback. The smokehouse includes a cabinet provided with an internal smoking chamber fitted with brackets for receiving spaced trays. The smoking chamber is separated from the walls of the cabinet enclosure and smoke from a firebox located in the base of the cabinet flows through openings provided in the smoking chamber to permeate the meat or other food located on the trays. U.S. Pat. No. 1,493,889, dated May 13, 1924, to S. S. Mims, details an "Apparatus for Treating Vegetables". The apparatus includes a structure having a multi-wall chamber, wherein vegetables such as sweet potatoes, as well as fruits, hay, tobacco and the like, can be exposed to carbon monoxide and carbon dioxide gases generated within the enclosure. The chamber features spaced side walls, in order to incorporate a dead air space therebetween for insulation purposes. A "Method of Smoking Food and Apparatus For Use in Connection Therewith" is detailed in U.S. Pat. No. 2,246,804, dated June 24, 1941, to M. Lipschutz. The device in which the method is practiced includes an inner cylindrical chamber located within an outer enclosure, which inner chamber includes an outer concentric area for receiving wood chips and an unobstructed inner core provided with openings therein for generating smoke from the smoldering wood chips. A small fire is used to ignite the wood chips and create the smoke, which is channeled through a connecting conduit to a smokehouse containing food to be smoked. A "Barbeque Truck" is detailed in U.S. Pat. No. 2,851,941, dated Sept. 16, 1958, to J. M. Cogar. The barbeque truck includes a firebox located adjacent to a smoking chamber, wherein smoke is transferred from the burning fuel through the smoking chamber and from the smoking chamber to a chimney provided with a damper.

It is an object of this invention to provide a smoking and baking apparatus which is characterized by an enclosure having an inner and an outer wall that define a smoke channel, a firebox for generating smoke through the smoke channel in smoking and baking mode under circumstances where a removable water pan is located in the enclosure above the firebox and beneath a cooking chamber defined by the inner wall, and further including at least one closure or door and a chimney, the lower end of which communicates with the cooking chamber and the upper end of which is vented to the atmosphere, such that the smoke is deflected by the water pan through the channel, downwardly through the cooking chamber across the food to be smoked and cooked, and upwardly through the chimney.

Another object of this invention is to provide a smoking and baking apparatus which can be converted to a barbeque and grilling apparatus by removing a water pan from the apparatus, which apparatus includes a cabinet having at least one door and an inner and outer wall that define an channel therebetween, a firebox and fuel tray located in the bottom of the cabinet, an air vent provided in the outer wall in communication with the firebox, a cooking chamber defined by the inner wall and located above the firebox, a chimney having a bottom end communicating with the cooking chamber and a top end vented to the atmosphere, wherein the water pan is adapted for removably seating in the cabinet between the firebox chamber and the cooking chamber to place the apparatus in smoking and baking mode and the water pan is removed from the cabinet to convert the apparatus to the barbequing and grilling mode.

Still another object of the invention is to provide a new and improved smoking, baking, grilling and barbequing apparatus which includes a firebox containing a removable fuel tray, an internal annulus communicating with the firebox, a cooking chamber located above the firebox, a chimney having one end communicating with the cooking chamber and the other end vented to the atmosphere and two doors, one of which closes the cooking chamber and the other closing the firebox, wherein a removable water pan is positioned between the cooking chamber and the firebox to introduce moisture into the cooking chamber and divert smoke through the channel and cooking chamber to increase smoke retention time with food to be smoked in a smoking and baking mode, and the water pan is removed from the apparatus for directly applying smoke and heat from the firebox to the cooking chamber.

Still another object of the invention is to provide a new and improved smoking and baking apparatus which is designed to use a removable water tray or pan for optionally directing smoke and heat through an channel located in the apparatus enclosure into a cooking chamber and a chimney, in order to increase the smoke-food contact and provide a smoking and baking function, and directly into the cooking chamber for grilling and barbeque cooking.

SUMMARY OF THE INVENTION

These and other objects of the invention are provided in a new and improved smoking and baking, as well as grilling and barbequing apparatus, which apparatus is characterized by a cabinet fitted with an outer shell and an inner shell that define a smoke channel therebetween, a firebox and removable fuel tray for generating smoke and selectively channeling the smoke through the smoke channel into a cooking chamber defined by the inner shell, an adjustable air vent in the outer shell for introducing air into the firebox; a chimney, the bottom end of which communicates with the cooking chamber and the top end of which extends through the outer shell and is vented to the atmosphere, and a removable water pan located between the firebox and the cooking chamber, whereby smoke and heat are channeled from the firebox upwardly through the channel, then downwardly through the cooking chamber and again upwardly through the chimney to the atmosphere when the water pan is in the cabinet, and the smoke and heat are generated directly into the cooking chamber when the water pan is removed from the cabinet.

BRIEF DESCRIPTION OF THE DRAWING

The invention will be better understood by reference to the accompanying drawing, wherein:

FIG. 1 is a perspective view of a preferred embodiment of the smoking and baking apparatus of this invention;

FIG. 2 is a front sectional view taken along line 2—2 of the smoking and baking apparatus illustrated in FIG. 1;

FIG. 3 is a side sectional view taken along line 3—3 of the smoking and baking apparatus illustrated in FIG. 2; and FIG. 4 is a top sectional view taken along line 4—4 of the smoking and baking apparatus illustrated in FIG. 2.

DESCRIPTION OF THE PREFERRED EMBODIMENTS

Referring initially to FIG. 1 of the drawing, the smoking and baking apparatus of this invention is generally illustrated by reference numeral 1. The smoking and baking apparatus 1 is characterized by an upward-standing, generally rectangular-shaped cabinet 2, defined by an outer shell 3, which is closed at the top by a top panel 17 and at the bottom by a bottom panel 11. The cabinet 2 is further provided with a pair of cooking chamber doors 13, which are attached to the front margin 12 of the cabinet 2 by means of spaced hinges 14, respectively, and cooperating door latches 15 serve to close the cooking chamber doors 13 on the front margin 12, respectively. A firebox door 16 is located beneath the cooking chamber doors 13 and is likewise suspended on the front margin 12 of the cabinet 2 by a pair of hinges 14. The firebox door 16 is secured in closed configuration on the front margin 12 and closes the firebox 23 by operation of a separate door latch 15. Alternatively, it is understood by those skilled in the art that a single cooking chamber door 13 may be provided on the front margin 12 of the cabinet 2 above the firebox door 16, as desired. A thermostat 31 projects through one of the cooking chamber doors 13 to facilitate monitoring the temperature of the cooking chamber 10, as hereinafter further described. An adjustable air vent 27 is provided in the outer shell 3 of the cabinet 2 adjacent to the firebox door 16 and includes a sliding air vent closure 28, which is designed to selectively expose and close the vent openings 29, that communicate with the firebox 23 of the cabinet 2.

Referring now to FIGS. 2–4 of the drawing, an inner shell 4 is provided inside the cabinet 2 in spaced relationship with respect to the outer shell 3, in order to define a smoke channel 5 in both sides and the rear portion of the cabinet 2, as illustrated. The inner shell 4 terminates at the firebox 23, which firebox 23 receives a removable fuel tray 25, mounted on a firebox bracket or plate 24 that is welded or otherwise secured to the spaced plate supports 19, welded to the bottom panel 11, as illustrated in FIG. 2. A pair of water pan brackets 20 are welded or otherwise secured to the inner shell 4 in the firebox 23 above the firebox plate 24 and the fuel tray 25, in order to removably receive a water pan 21, as further illustrated in FIGS. 2–4. A duct or chimney 6 is vertically oriented in that portion of the smoke channel 5 of the cabinet 2 which extends across the back of the cabinet 2 and includes a chimney inlet 7, which projects through the inner shell 4 immediately above the water pan 21 and a chimney outlet 8, which opens to the atmosphere through the outer shell 3 near the top panel 17 of the cabinet 2. A seal plate 26 seals the bottom of the chimney 6 and the top of the chimney 6 may be sealed or left open, as illustrated in FIG. 2, in order to facilitate additional circulation of smoke. Furthermore, the inner shell 4 is preferably welded to the front margins 12 and the chimney 6. Accordingly, the chimney 6 defines a chimney chamber 9 located in the smoke channel 5 of the cabinet 2, for channelling smoke and heat from the interior of the cabinet 2, as hereinafter further described. The cooking chamber 10, which is defined by the inner shell 14, is closed by the cooking chamber doors 13 and is open at the top, in order to facilitate a flow of smoke and heat from the fuel tray 25 and the firebox 23 upwardly through the smoke channel 5, defined by the outer shell 3 and the inner shell 4, and then downwardly, into the cooking chamber 10, as indicated by the arrows. One or more racks (not illustrated) may be inserted in the horizontally spaced tray brackets 18, which are welded or otherwise secured to the inner shell 4, and used to support meat or other food (not illustrated) to be smoked, baked, barbequed or grilled. As the smoke is directed downwardly as further indicated by the arrows from the top panel 17 of the cabinet 2 across racks placed in the cooking chamber 10, the smoke is maintained in contact with the food for a considerable period of time before entering the chimney chamber 9 through the chimney inlet 7. The smoke then flows through the chimney chamber 9 upwardly and exits the cabinet 2 through the chimney outlet 8. It is understood that the flow of smoke from the fuel tray 25 and the firebox 23 successively through the smoke channel 5, cooking chamber 10 and chimney 6 is facilitated by placing the water pan 21 on the water pan flanges 22, to block the normal path of smoke from the firebox 23 directly into the cooking chamber 10, as illustrated in FIGS. 2-4. The water pan 21 normally contains water which evaporates directly into the cooking chamber 10 to prevent the meat or other food from drying excessively during the smoking and/or baking operation of the smoking and baking apparatus 1.

In an alternative configuration of the smoke and baking apparatus 1, the water pan 21 is removed from the water pan flanges 22, thereby allowing smoke and heat from fuel burning in the fuel tray 25 located in the firebox 23, to rise upwardly directly into the cooking chamber 10 and contact the meat or other food placed on the racks located in the tray brackets 18. The smoking and baking apparatus 1 is thusly placed in a barbecuing or grilling mode, rather than the smoking and baking mode described above.

It will be appreciated by those skilled in the art that the smoking and baking apparatus of this invention facilitates a highly efficient and versatile apparatus for achieving smoking and baking or baking only on the one hand, and barbecuing and grilling on the other, depending upon the presence of a water pan therein. The smoking and baking apparatus also provides quick and easy access to various types of food for smoking and or baking, as well as barbequing and grilling purposes. The water pan contains water for introducing moisture into the cooking chamber to avoid excessive drying of the food, and particularly meat, during the baking and/or smoking mode, and the water pan and fuel tray can be easily removed from the cabinet for replacement and cleaning, as well as loading with water and fuel, respectively. Since the heated smoke generated in the firebox 23 moves upwardly in the cabinet through the smoke channel 5 when the cabinet is used in the baking and/or smoking mode, the cooking chamber 10 is well insulated from atmospheric conditions and is maintained at an ideal temperature by controlling the intensity of the fire in the fuel tray 25. The fire intensity is controlled by operation of the air vent 27 in conventional manner and by the quantity and type of fuel burned in the firebox 23. It is understood that the air vent 27 may include one or more holes or openings drilled or punched in the outer shell 3 for smaller units of the smoking and baking apparatus 1. Furthermore, the tortuous path through which the smoke is directed facilitates a desirable smoke retention time in the cooking chamber 10, to better flavor the food. Flavor control is also accomplished by the choice and quantity of wood burned on the fuel tray 25 in the firebox 23. Accordingly, smoke-producing wood such as hickory, pecan and mesquite, in non-exclusive particular, can be burned in the firebox 23 to generate smoke having a selected flavor, as desired.

It will be further appreciated that under circumstances where the smoking and baking apparatus 1 is to be used primarily for baking, food placed in the cooking chamber 10, charcoal or an alternative relatively low smoke-producing fuel can be burned on the fuel tray 25, with the water pan 21 in place on the water pan brackets 20 to control the heat introduced into the cooking chamber 10 and provide moisture for controlled baking.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. An apparatus for cooking and smoking food comprising an upright cabinet which comprises an outer shell and a top panel closing the top of said outer shell; and inner shell spaced from said outer shell to define a vertical channel between said outer shell and said inner shell, the inner shell having an upper opening and a lower opening; a firebox for generating smoke provided in the bottom of said cabinet in communication with said vertical channel, the upper opening indirectly communicating with the firebox through the vertical channel and the lower opening directly communicating with the firebox; at least one air vent provided in said outer shell in communication with said firebox for supplying air to said firebox; a cooking chamber in and substantially defined by said inner shell and located in communication with said vertical channel above said firebox for receiving and cooking food; at least one door hingedly carried by said cabinet for selectively providing access to the interior of said cabinet; a chimney vertically disposed in said vertical channel, said chimney extending from an inlet opening provided in said inner shell at said cooking chamber upwardly in said channel to an outlet opening provided in said outer shell and spaced from said inlet opening, the outlet opening communicating with the atmosphere; a water pan; and seating means for removably seating the water pan in said cabinet between said firebox and said cooking chamber, the water pan blocking flow of smoke from the firebox into the cooking chamber through the lower opening of the inner shell when the water pan is seated in the seating means and removal of the water pan permitting flow of smoke from the firebox into the cooking chamber through the lower opening, whereby smoke generated in said firebox is directed upwardly through said vertical channel, downwardly from the top of said vertical channel into said cooking chamber and into said chimney and upwardly through said outlet opening to the atmosphere when said water pan is placed in said cabinet and smoke is alteratively allowed to flow from said firebox directly into said cooking chamber when said water pan is removed from said cabinet.

2. The apparatus of claim 1 further comprising a bottom panel closing the bottom of said outer shell and wherein said at least one door further comprises a top door hingedly carried by said cabinet, said top door substantially coextensive with said cooking chamber and extending downwardly to the top of said firebox and a bottom door hingedly carried by said cabinet beneath said top door, said bottom door substantially coextensive with said firebox.

3. An apparatus for cooking and smoking food comprising a box-like, upright cabinet which comprises an outer shell, a top panel closing the top of said outer shell and a bottom panel closing the bottom of said outer shell; an inner shell spaced from said outer shell to define a smoke-receiving, vertical channel between said outer shell and said inner shell, the inner shell having an upper opening and a lower opening; a firebox for generating smoke provided in the bottom of said cabinet in communication with said vertical channel, the upper opening indirectly communicating with the firebox through the vertical channel and the lower opening directly communicating with the firebox; at least one adjustable air vent provided in said outer shell in communication with said firebox for supplying air to said firebox; a cooking chamber in and substantially defined by said inner shell and located above said firebox and communicating with said vertical channel for receiving and cooking food; a cooking chamber door hingedly carried by said cabinet for accessing said cooking chamber; a firebox door hingedly carried by said cabinet beneath said cooking chamber door for accessing said firebox; a chimney vertically disposed in said vertical channel, said chimney having an inlet opening provided in said inner shell at said cooking chamber and an outlet opening provided in said outer shell, said outlet opening being spaced above said inlet opening and being in communication with the atmosphere; a water pan; and seating means for removably seating the water pan in said cabinet between said firebox and said cooking chamber, the water pan blocking flow of smoke from the firebox into the cooking chamber through the lower opening of the inner shell when the water pan is seated in the seating means and removal of the water pan permitting flow of smoke from the firebox into the cooking chamber through the lower opening, whereby smoke generated in said firebox is directed upwardly through said vertical channel, downwardly from the top of said vertical channel into said cooking chamber and into said chimney and upwardly through said outlet opening to the atmosphere when said water pan is placed in said cabinet, and smoke is alternatively allowed to flow from said firebox upwardly directly into said cooking chamber when said water pan is removed from said cabinet.

* * * * *